United States Patent
Dowlatkhah

(10) Patent No.: US 8,311,537 B2
(45) Date of Patent: Nov. 13, 2012

(54) SYSTEMS AND METHODS TO DYNAMICALLY PROVISION SUBSCRIBERS IN A NETWORK

(75) Inventor: Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 358 days.

(21) Appl. No.: 12/638,700

(22) Filed: Dec. 15, 2009

(65) Prior Publication Data

US 2011/0143782 A1    Jun. 16, 2011

(51) Int. Cl.
*H04W 4/00* (2009.01)

(52) U.S. Cl. .................. 455/433; 455/432.1; 455/432.3; 455/456.5

(58) Field of Classification Search ......................... None
See application file for complete search history.

(56) References Cited

U.S. PATENT DOCUMENTS

| 6,708,033 | B1 | 3/2004 | Linkola et al. |
| 6,731,932 | B1* | 5/2004 | Rune et al. .................. 455/432.1 |
| 6,810,259 | B1* | 10/2004 | Zhang ......................... 455/456.5 |
| 2008/0014930 | A1* | 1/2008 | Jokinen et al. ............. 455/432.3 |
| 2008/0153488 | A1* | 6/2008 | Ruhanen et al. ........... 455/435.1 |

* cited by examiner

*Primary Examiner* — Erika A Washington

(74) *Attorney, Agent, or Firm* — Hanley, Flight & Zimmerman, LLC

(57) ABSTRACT

Systems and methods to dynamically provision subscribers in a network are disclosed herein. An example method to provision a subscriber in a communication network includes detecting that a location of the subscriber has changed from a first location to a second location, instructing a first customer profile repository to transfer a customer profile associated with the subscriber to a second customer profile repository corresponding to the second location in response to detecting the location change, and provisioning the customer profile at the second customer profile repository.

17 Claims, 5 Drawing Sheets

SYSTEMS AND METHODS TO DYNAMICALLY PROVISION SUBSCRIBERS IN A NETWORK

FIELD OF THE DISCLOSURE

This disclosure is related generally to provisioning subscribers in a network and, more particularly, to systems and methods to dynamically provision subscribers in a network.

BACKGROUND

User provisioning in a communication network refers to the creation, maintenance, and deactivation of user profiles containing objects and attributes for defining and providing services used by a user. When a new subscriber is added to the communication network, a user profile is provisioned with attributes relevant to the subscriber, such as location, services used, and/or level of service. When a subscriber's attributes change, the corresponding user profile is also updated with the attributes to provide efficient service to the subscriber.

DETAILED DESCRIPTION

Figure 1:
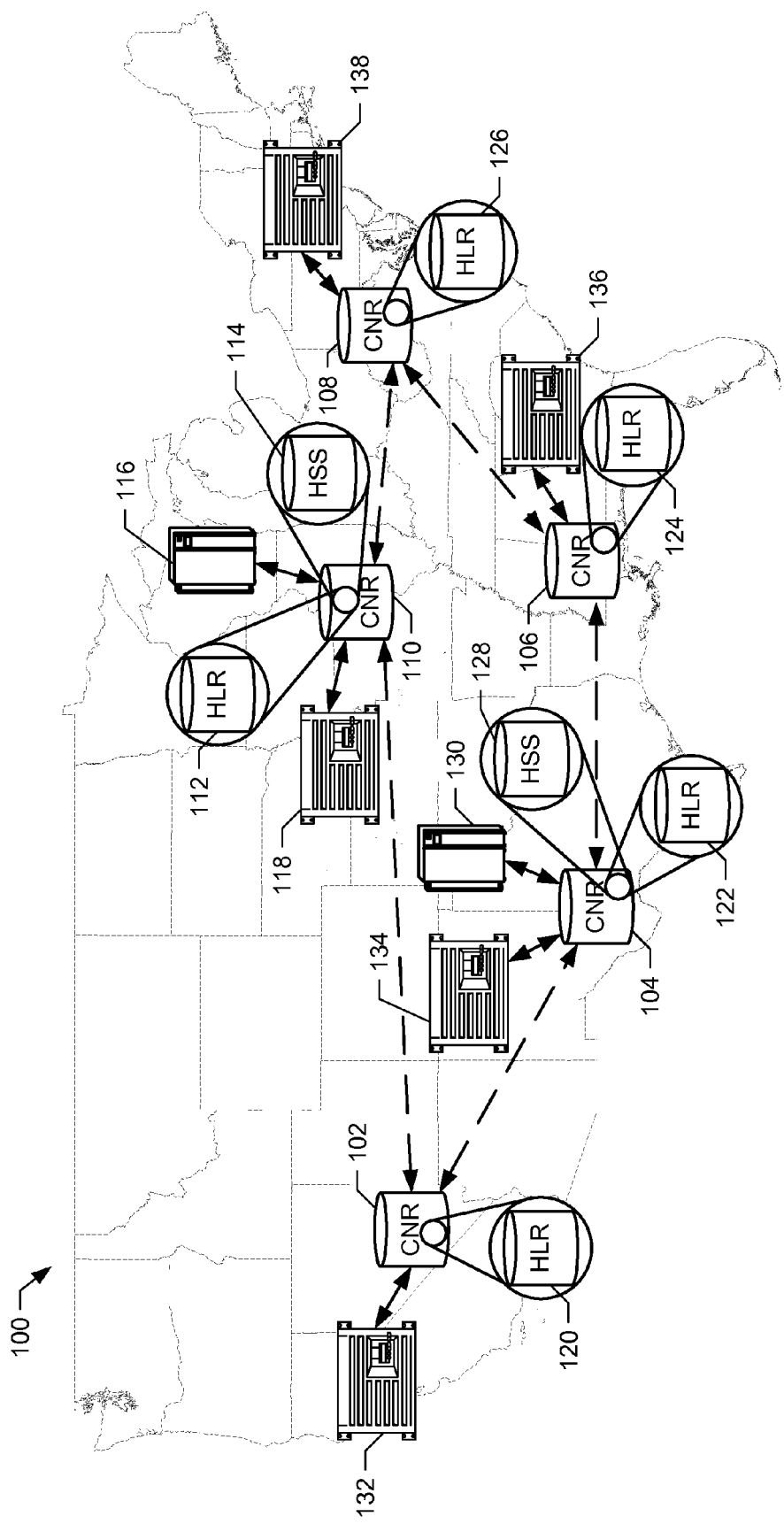
FIG. 1 is a map illustrating an example consolidated network repository system.

Certain examples are shown in the above-identified figures and described in detail below. In describing these examples, like or identical reference numbers may be used to identify similar elements. The figures are not necessarily to scale and certain features and certain views of the figures may be shown exaggerated in scale or in schematic for clarity and/or conciseness. Although the following discloses example methods, apparatus, and articles of manufacture, it should be noted that such methods, apparatus, and articles of manufacture are merely illustrative and should not be considered as limiting. Accordingly, while the following describes example methods, apparatus, and articles of manufacture, the examples are not the only way to implement such methods, apparatus, and articles of manufacture.

The example systems, methods, and articles of manufacture described herein may be used to reduce the traffic and expense associated with provisioning subscriber profiles in a consolidated network repository (CNR) system. Provisioning subscriber profiles using previous methods can be a time-consuming process and is generally performed only after a subscriber notifies a service provider that he or she has moved locations. Unlike previous provisioning techniques, the example systems, methods, and articles of manufacture described herein automatically detect when a subscriber has moved locations from a region served by a first regional customer profile repository to another region served by a second regional customer profile repository that is part of the same logical CNR as the first regional customer profile repository. In some examples, when the system detects the change in location, the system automatically provisions the subscriber in accordance with predefined criteria, such as the time elapsed since the change in location and/or network preferences in the appropriate regional customer profile repository corresponding to the subscriber's new location. Additionally, the example systems may notify one or more network subsystems such as an IT system, a billing system, and/or a central subscriber manager that the regional customer profile repository in which the subscriber is provisioned has changed.

In some examples, when a system automatically detects a change in subscriber location from the subscriber's home region to another host region, a first subscriber manager that manages the subscriber's home customer profile repository causes the home customer profile repository to transfer the subscriber's profile to a host customer profile repository corresponding to the host region. When the subscriber profile is transferred, the host customer profile repository notifies a second subscriber manager that manages the host customer profile repository that the subscriber profile has been transferred thereto.

The example systems and methods described herein increase the efficiency of subscriber management within a CNR system. Further, relative to existing provisioning techniques, the example systems and methods reduce the workload of information technology (IT) staff and network operators involved in implementing user provisioning. By automatically notifying the IT systems of a change in the location of a subscriber, the example systems reduce or eliminate the manual interaction with the large CNR that was previously necessary to provision a subscriber in a new location. For example, the existing approach of manual provisioning of a subscriber from one location to another may take several months due to backlogs in network operator workload. In contrast, the example systems and methods may trigger substantially immediate provisioning of the subscriber to a new location based on any appropriate criteria.

Additionally, the example systems and methods described herein can reduce the cost of operating the network by reducing or eliminating traffic that is generated when a subscriber's home CNR is in a different location than the subscriber's current permanent location. When the subscriber is in a different location, traffic (e.g., calls) requesting information from the subscriber's customer profile must be routed to the subscriber's home CNR, which then reroutes the customer profile and/or the information requested therefrom to the requesting entity (e.g., server and/or location). Each request associated with the subscriber is routed to the subscriber's home CNR in this manner, thereby causing a substantial amount of extra traffic in the network, which can be eliminated by dynamically provisioning the subscriber at the new host CNR as described below.

FIG. 1 is a map illustrating an example CNR system 100. The example CNR system 100 includes several regional CNRs 102, 104, 106, 108, and 110. While the regional CNRs 102-110 are implemented using different physical repositories (e.g., databases), the CNRs 102-110 are linked on a common logical layer. The example regional CNR 110 includes at least part of a home location register (HLR) 112 and/or a home subscriber server (HSS) 114, and is connected to an Internet protocol (IP) multimedia server (IMS) node 116 and a mobile switching center (MSC) 118. The other regional CNRs 102-108 include similar combinations of HLRs 120, 122, 124, or 126 and an HSS 128 and are connected to similar combinations of IMS nodes 130 and/or MSCs 132, 134, 136, or 138.

The HLR 112 includes details of mobile phone subscribers that are authorized to use a mobile phone system. The example HLR 112 includes mobile subscriber profiles used for serving mobile subscriber applications and/or services. The HSS 114 is a user database that supports IMS systems that handle calls. While the HLRs 112 and 120-126 and the HSSs 114 and 128 are traditionally separate subscriber profile databases, in the illustrated example, the data previously contained within the HLRs 112 and 120-126 and the HSSs 114 and 128 is integrated into customer profiles in the CNRs 102-110. Thus, any network application or service that requires customer profile data may query the CNRs 102-110 to receive the appropriate data.

The IMS node 116 facilitates calls when a calling IMS subscriber calls another (called) IMS subscriber. For example, the IMS node 116 accesses the CNR 102-110 to determine the IMS subscriber associated with the phone number (or other identifier) being called. If, for example, the calling subscriber resides on CNR 110 and the called subscriber resides on a different CNR, such as CNR 104, the CNR 110 coupled to the originating IMS node 116 queries the CNR 104 coupled to the destination IMS node 130 for call information associated with the called subscriber. The CNR 104 then locates the subscriber profile of the call and provides the information to the CNR 110, which in turn provides the information to the IMS node 116. The MSCs 118 and 132-138 are responsible for setting up and releasing end-to-end call connections, handling mobility functions such as handover, and performing charging and billing functions. As a result, the MSCs 118 and 132-138 also request customer profile data from the CNRs 102-110 to properly charge customer accounts for calls made via the IMS system.

While a few example servers are illustrated in FIG. 1, the CNRs 102-108 may be communicatively coupled with other types of application servers that require access to customer profiles. For example, customer profiles may exist for any one or more of mobile voice and/or data communications, short message service (SMS) communications, multimedia delivery, digital subscriber line and/or optical Internet communications, digital and/or plain old telephone service (POTS) voice services, web hosting, virtual private network (VPN) communications, teleconference and/or multimedia conferencing, and/or any other types of media and/or communication services for which customers may subscribe.

Figure 2:
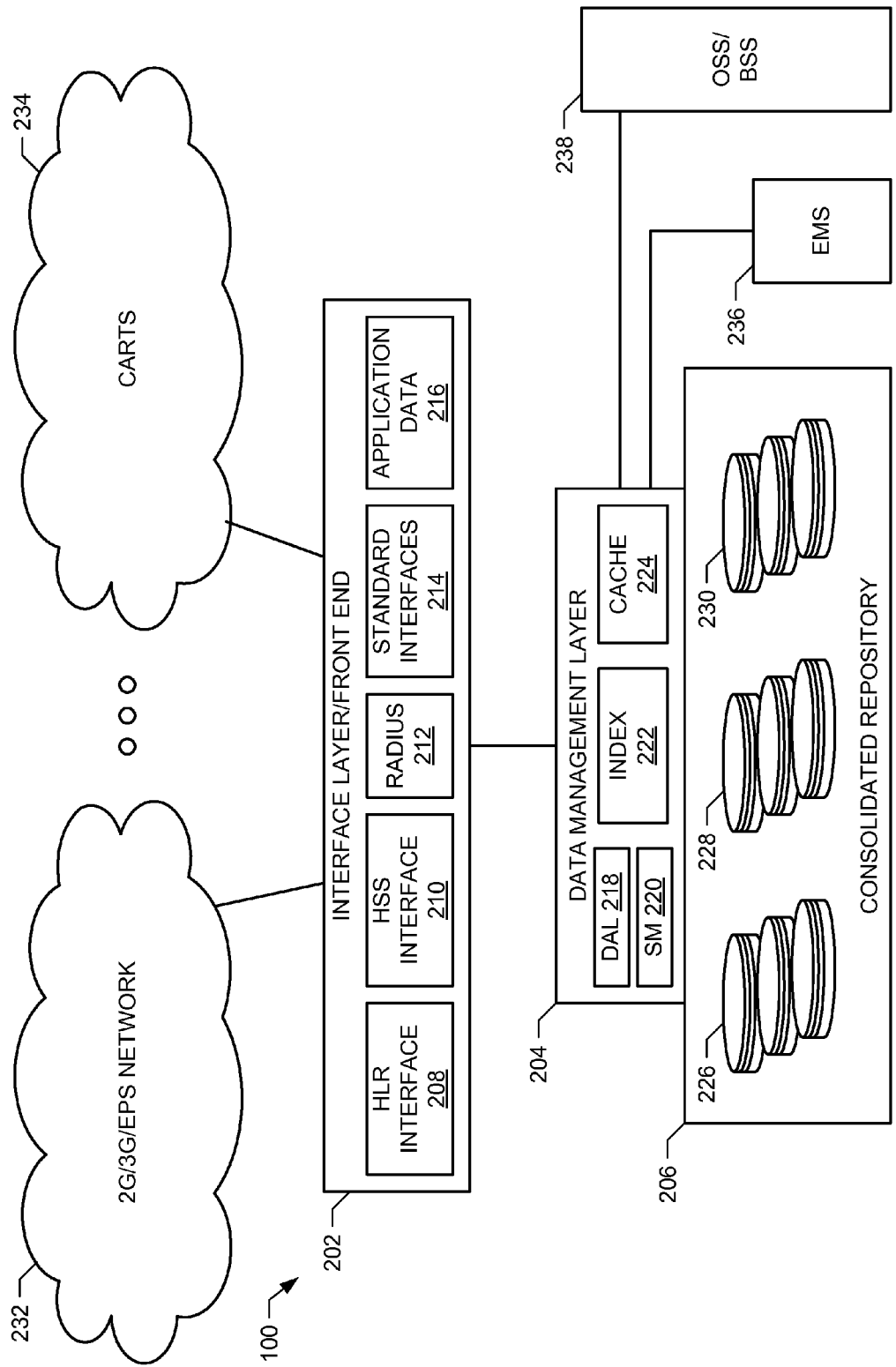
FIG. 2 is a block diagram illustrating a logical view of the example consolidated network repository system of FIG. 1.

FIG. 2 is a block diagram illustrating a logical view of the example CNR system 100 of FIG. 1. The example CNR system 100 includes an interface layer 202, a data management layer 204, and a consolidated repository 206. The interface layer 202 presents an interface to application servers for requesting data according to different protocols.

The CNR system 100 may process data and/or queries from different systems having different protocols. To interface with different systems using different protocols, the example interface layer 202 includes different interface and/or mapping modules 208-216. The mapping modules 208-216 translate the different protocols and/or queries to a common protocol used by the data management layer 204 and/or the consolidated repository 206. The mapping modules 208-216 further map response and/or data back to a protocol and/or format used by the requesting system.

The example data management layer 204 includes a data adaptation layer (DAL) 218, a subscriber manager (SM) 220, an index 222, and a cache 224. The DAL 218 receives queries via the interface layer 202 and determines the appropriate handling mechanism for each query. For example, the DAL 218 may determine that requested data is cached by the cache 224 or may refer the query to the index 222 to determine the location of the requested data. The SM 220 provisions subscribers in the consolidated repository 206, the index 222, and/or the cache 224. For example, the SM 220 may receive a new subscriber request from an IT system (e.g., the OSS/BSS system 238 described below) to provision a new subscriber, causing the SM 220 to provision (e.g., create) a new customer profile in the consolidated repository 206. The SM 220 also determines whether a subscriber is to be provisioned at another region (e.g., another instance of the consolidated repository 206). As described below, the consolidated repository 206 may store the customer profile in multiple physical locations for redundancy purposes.

The example consolidated repository 206 includes multiple regional repositories 226, 228, and 230, each of which may include one or more physical repositories (e.g., databases). In the illustrated example, the regional repositories 226, 228, and 230 include redundant databases dispersed among the respective physical regions and/or between physical regions. When accessing the consolidated repository 206, applications from a 2G/3G/EPS network 232, a core architecture for real-time services (CARTS) network 234, and/or other application servers or networks submit requests for customer profiles via the interface layer 202 and the data management layer 204. The 2G/3G/EPS network 232 is a communications network that provides mobile (e.g., wireless) communications service to subscribers. The CARTS network 234 provides a framework for adding future services, which may access the CNR system 100 via the interface layer 202. The CNR system 100 serves the 2G/3G/EPS network 232 and the CARTS network 234 as a consolidated repository for customer profiles. If the cache 224 does not have the requested customer profile readily available, the index 222 determines whether the requested customer profile is in a particular regional repository 226, 228, or 230 and/or determines where the customer profile may be accessed.

The CNR system 100 further includes an equipment management system (EMS) server 236 and an operation support system (OSS)/business support system (BSS) 238. The EMS 236 manages and distributes the CNR system 100 including the interface layer 202, the data management layer 204, and the consolidated repository 206. For example, the EMS 236 may generate performance measurements of the CNR system 100 and redistribute processing among portions of the CNR system 100 to improve performance if necessary. The OSS/BSS 238 includes the business and/or operations systems that allow network operators to interact with, modify, and/or repair the CNR system 100. For example, a customer service representative may access the CNR system 100 via the OSS/BSS 238 to modify a customer profile to add, delete, and/or modify services for a subscriber in response to a call from the subscriber requesting the same. Additionally or alternatively, network operators may access the CNR system 100 via the OSS/BSS 238 to perform updates and/or maintenance to the interface layer 202, the data management layer 204, and/or the consolidated repository 206.

Figure 3:
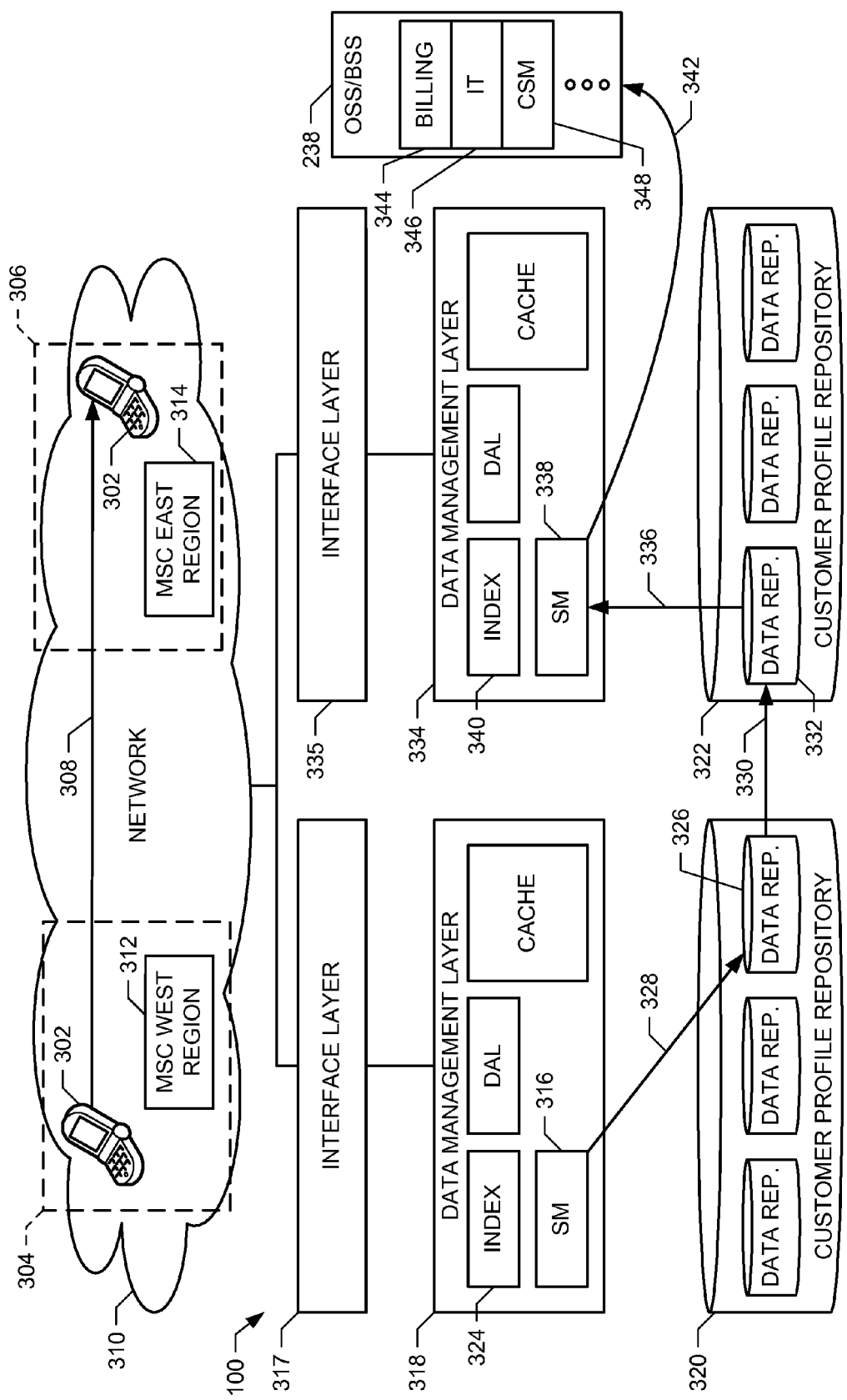
FIG. 3 illustrates a data flow of an example method to dynamically provision a subscriber in a network.

FIG. 3 illustrates a data flow of an example method to dynamically provision a subscriber 302 in a network 310. The subscriber 302 used in the example described in FIG. 3 is represented by a mobile device that moves from a first geographic region 304 to a second geographic region 306. The move is represented by a line 308 (also referred to herein as the move 308), and both regions 304 and 306 are served by the example communications network 310. The communication network 310 may be implemented via, for example, the 2G/3G/EPS network 232 and/or the CARTS 234 of FIG. 2. The first, or home, region 304, which is also referred to as a west region in FIG. 3, is served by an MSC 312. Similarly, the second, or new host, region 306, which is also referred to as an east region, is served by a second MSC 314.

The example CNR system 100 illustrated in FIG. 3 includes an example interface layer 317, an example data management layer 318 that includes an SM 316 and an index 324, and an example customer profile repository 320 that includes a data repository 326, and may be considered an instance of the example CNR system 100 of FIG. 2 that serves the first region 304 of FIG. 3. The example CNR system 100 further includes a customer profile repository 322 that includes a data repository 332, a data management layer 334 that includes an SM 338 and an index 340, and an interface layer 335, and may be considered an instance of the example CNR system 100 of FIG. 2 that serves the second region 306 of FIG. 3.

Figure 4:
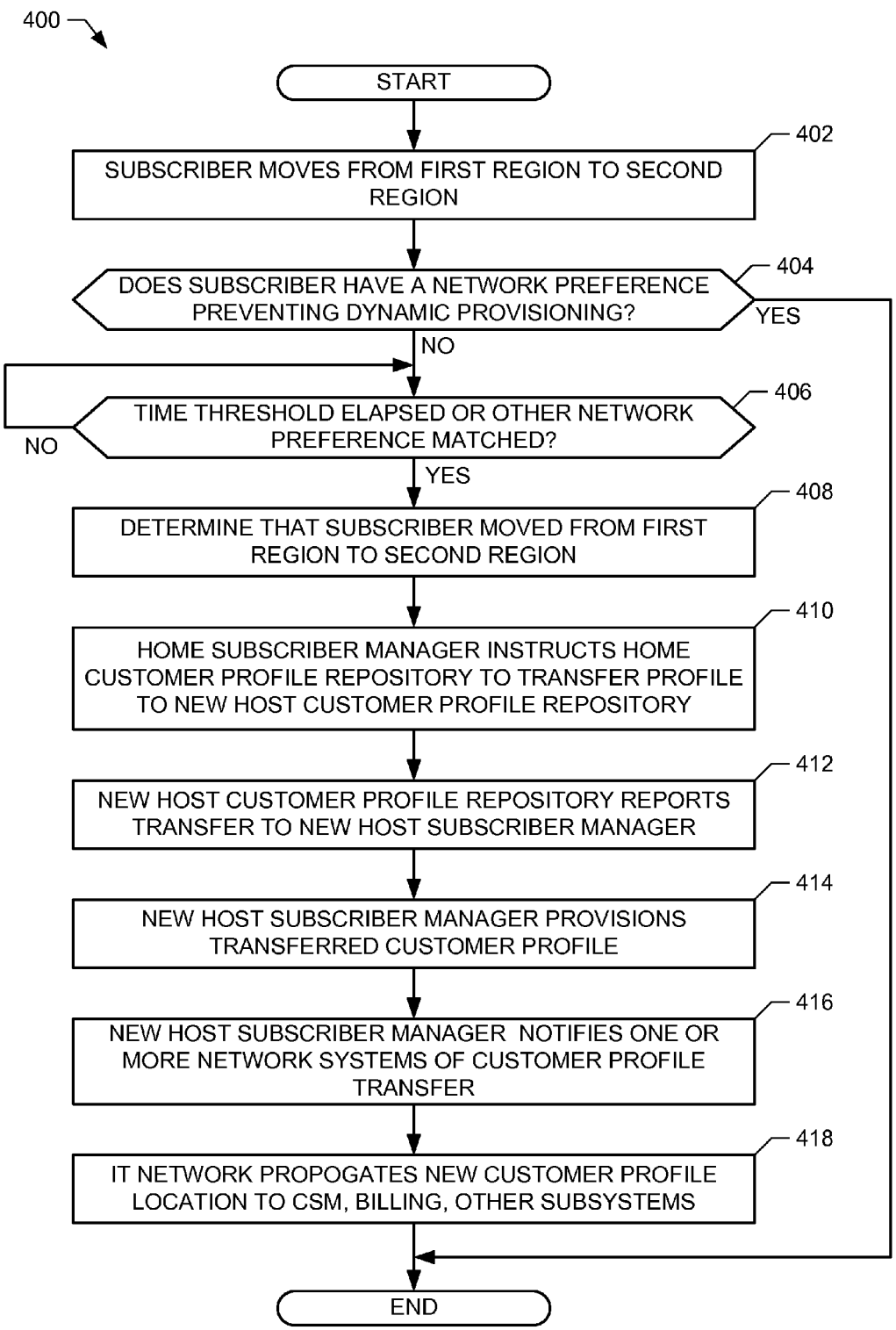
FIG. 4 is a flowchart representative of example machine readable instructions that may be executed to dynamically provision a subscriber in a network.

The example flow illustrated in FIG. 3 is described in combination with the flowchart illustrated in FIG. 4, which is representative of example machine readable instructions 400 that may be executed to dynamically provision a subscriber in the network 310 served by the CNR system 100. At some time after the example instructions 400 begin (e.g., after the CNR system 100 is implemented), the subscriber 302 moves from the first region 304 (e.g., the west region) to the second region 306 (e.g., the east region) (block 402). As mentioned above, the example SM 220 or, more generally, the data management layer 204 of FIG. 2 detects that the subscriber 302 is now in a different location. In the example of FIG. 3, an SM instance 316 in a data management layer instance 318 serving the first region 304 may detect that the subscriber 302 is in a different location by determining that requests to the data management layer instance 318 for the customer profile associated with the subscriber 302 originate from another region (e.g., the second region 306).

At some time after the subscriber 302 moves, block 404 determines whether the customer profile associated with the subscriber includes, for example, a network preference to prevent dynamic provisioning of the customer profile of the subscriber 302 to other locations (block 404). Not all moves by a subscriber 302 are permanent (e.g., such as moves associated with vacation, business travel, etc). For example, the subscriber 302 may travel often but may not permanently move home locations. In such a case, the subscriber 302 may express a desire not to change the home location associated with his customer profile. If the customer profile has such a network preference (block 404), the example instructions 400 may end.

Thus, the SM 316 monitors the subscriber 302 for conditions that may indicate permanence of the move 308. In the example of FIGS. 3 and 4, if the customer profile for the subscriber 302 does not have a network preference preventing dynamic provisioning (block 404), the SM 316 determines whether a time threshold has elapsed or another network preference is matched (block 406). For example, if the subscriber 302 is in the second region 306 for a duration of time exceeding a threshold (e.g., longer than a month), the SM 316 determines that the subscriber 302 has permanently moved to the second region 306. In an example of matching a network preference, if the subscriber 302 uses a heavy amount of traffic from the second region 306, additional network traffic may be generated between the regions 304 and 306 to serve the subscriber in the second, or new host, region 306 and, thus, the network 310 would benefit from dynamically provisioning the subscriber's customer profile to the second region 306. Alternatively, block 406 may determine whether other types of thresholds have been traversed (e.g., a number of services exceeds a threshold, a services usage exceeds a threshold). If the traffic threshold has not been exceeded (block 406), control returns to block 406 to continue monitoring the time and/or other network preferences.

However, if either the time threshold has elapsed or another network preference has been matched, (block 406), the SM 316 determines that the subscriber 302 has moved to the second region 306 (block 408). In response, the SM 316 instructs a local instance 320 of the customer profile repository corresponding to (e.g., serving) the first region 304 to transfer the customer profile associated with the subscriber 302 to a second local instance 322 of the customer profile repository corresponding to the second region 306 (block 410). The local instances 320 and 322 of the customer profile repository are logically implemented as part of the consolidated repository 206 of FIG. 2. However, the example local instances 320 and 322 are implemented using different physical repositories and/or logical divisions of the consolidated repository 206. For example, the customer profile repository 320 could be implemented by the regional repositories 226 of FIG. 2, and the customer profile repository 322 could be implemented by the regional repositories 228 of FIG. 2.

In the illustrated example, the SM 316 accesses an index 324 in the data management layer 318 to determine that the customer profile is in a physical data repository 326 implementing the local instance 320 of the customer profile repository 320. The SM 316 sends an instruction 328 to the data repository 326, which performs a transfer 330 to a physical data repository 332 in the local instance 322 of the customer profile repository. The transfer may occur via, for example, the data management layer 318 serving the first region 304 and a data management layer 334 serving the second region 306.

When the customer profile transfer 330 is complete, the new host customer profile repository reports 336 the transfer 330 to the new host SM 338 (block 412). In response, the new host SM 338 provisions the transferred customer profile (block 414). For example, the new host SM 338 creates the customer profile and associates the profile with the appropriate services in an index 340 in the new host data management layer 334 serving the second region 306. The new host SM 338 then sends a provisioning notice 342 to one or more OSS/BSS systems 238 of the customer profile transfer 330 and provisioning (block 416).

The OSS/BSS systems 238 may include, for example, billing systems 344, IT systems 346, and/or a central subscriber manager (CSM) 348. The billing systems 344 determine the correct billing rates at which services should be billed to the subscriber 302. For some services, billing rates are location-dependent and the correct location is used by the billing systems 344 to ensure the subscriber is not overcharged or undercharged by billing according to the wrong location rates. Previously, the IT systems 346 were responsible for provisioning subscribers in new locations and notifying other systems (e.g., the billing systems 344, the CSM 348) in the OSS/BSS systems 238 of subscriber information. Instead, the example CNR system 100 notifies the IT network 346 after automatically provisioning the subscriber 302 in the new host customer profile repository 322.

The CSM 348 is in communication with the SM instances 316 and 338, and performs, among other things, location indexing of the subscribers in the CNR 100. For example, the CSM 348 may determine, based on a provisioning notice, in what location in the CNR 100 a subscriber is to be provisioned. When the IT system 346 receives the provisioning notice 342 from the SM 338, the IT system 346 propagates the provisioned customer profile information to any additional systems (e.g., billing systems 344, CSM 348) that may use the information (block 418). The example instructions 400 may then end with the CNR network 100 now serving the subscriber 302 in the second region 306 using the associated customer profile repository 322 and corresponding data management layer 334.

Figure 5:
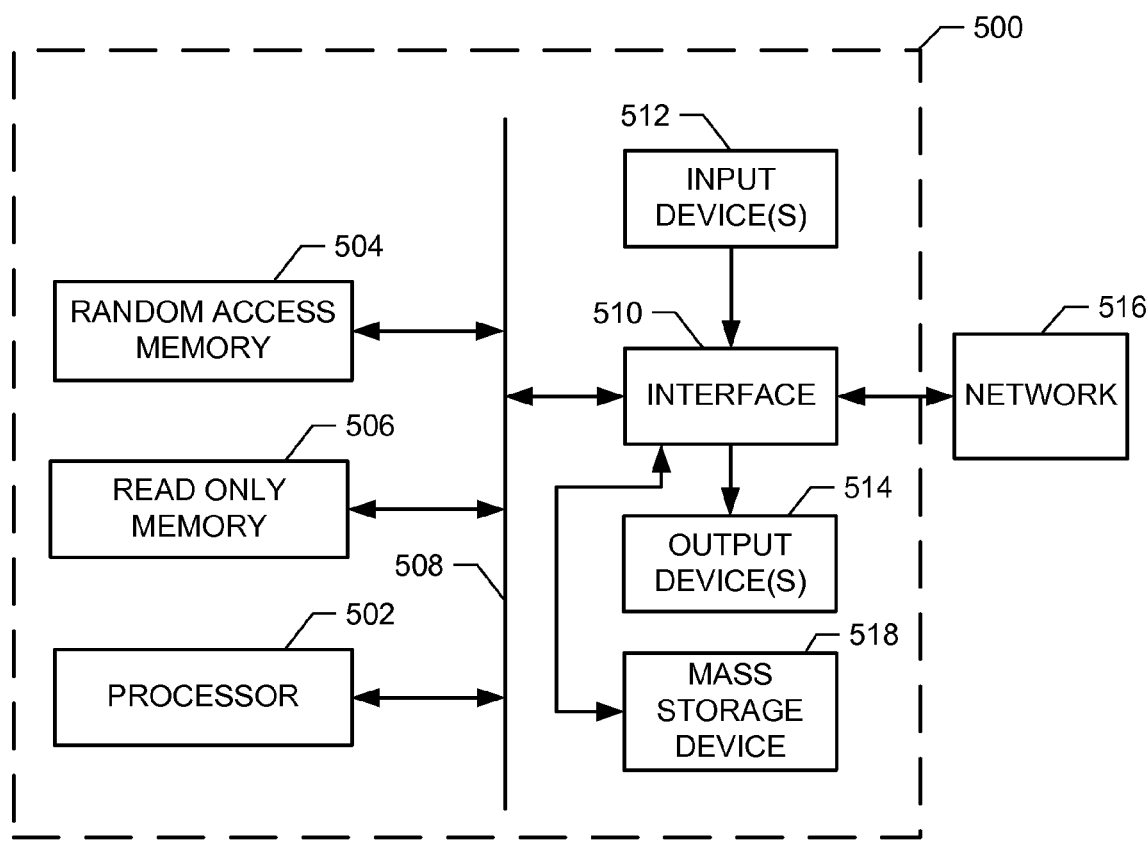
FIG. 5 is a block diagram of an example processing system that may execute the example machine readable instructions of FIG. 4 to implement an example interface layer, an example data management layer, an example consolidated repository, an example home location register interface, an example home subscriber server interface, an example RADIUS interface, an example standard interfaces, an example application data, an example data adaptation layer, an example subscriber manager, an example index, an example cache, an example regional repositories, an example equipment management system, an example operations support system/business support system, and/or an example consolidated network repository system of FIGS. 1-3, and/or the example systems and methods described herein.

FIG. 5 is a block diagram of an example processing system 500 that may execute the example machine readable instructions 400 of FIG. 4 to implement some or all of the example interface layer 202, the example data management layer 204, the example consolidated repository 206, the example HLR interface 208, the example HSS interface 210, the example RADIUS interface 212, the example standard interfaces 214, the example application data 216, the example data adaptation layer 218, the example SM 220, the example index 222, the example cache 224, the example regional repositories 226, 228, and 230, the example EMS 236, the example OSS/BSS 238, and/or, more generally, the example CNR system 100 of FIGS. 1-3. The processing system 500 can be, for example, a server, a personal computer, a personal digital assistant (PDA), an Internet appliance, or any other type of computing device.

The example system 500 includes a processor 502 such as a general purpose programmable processor. The processor 502 may execute, among other things, the machine readable instructions 400 of FIG. 4. The processor 502 may be any type of processing unit, such as one or more microprocessors from the Intel® Centrino® family of microprocessors, the Intel® Pentium® family of microprocessors, the Intel® Itanium® family of microprocessors, and/or the Intel®XScale® family of microprocessors. Of course, other processors from other families are also appropriate.

The processor 502 is in communication with a main memory including a volatile memory 504 and a non-volatile memory 506 via a bus 508. The volatile memory 504 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 506 may be implemented by flash memory and/or any other desired type of memory device. Access to the main memory 504, 506 is controlled by a memory controller (not shown).

The processing system 500 also includes an interface circuit 510. The interface circuit 510 may be implemented by any type of interface standard, such as an Ethernet interface, a universal serial bus (USB), and/or a third generation input/output (3GIO) interface.

One or more input devices 512 are connected to the interface circuit 510. The input device(s) 512 permit a user to enter data and commands into the processor 502. The input device(s) can be implemented by, for example, a keyboard, a mouse, a touchscreen, a track-pad, a trackball, isopoint and/or a voice recognition system.

One or more output devices 514 are also connected to the interface circuit 510. The output devices 514 can be implemented, for example, by display devices, such as a liquid crystal display, a cathode ray tube display (CRT), a printer and/or speakers. The interface circuit 510, thus, typically includes a graphics driver card.

The interface circuit 510 also includes a communication device such as a modem or network interface card to facilitate exchange of data with external computers via a network 516, such as an Ethernet connection, a digital subscriber line (DSL), a telephone line, coaxial cable, a cellular telephone system or any other network interface. The network 516 may be implemented via the communications 2G/3G/EPS network 232 and/or the CARTS 234 of FIG. 2, and/or the network 310 of FIG. 3.

The processing system 500 also includes one or more mass storage devices 518 for storing software and data. Examples of such mass storage devices 518 include floppy disk drives, hard drive disks, compact disk drives and digital versatile disk (DVD) drives.

As an alternative to implementing the methods and/or apparatus described herein in a system such as the device of FIG. 5, the methods and/or apparatus described herein may alternatively be embedded in a structure such as processor and/or an ASIC (application specific integrated circuit).

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example systems and/or methods described herein, either in whole or in part. Furthermore, alternative software implementations including, but not limited to, distributed processing or component/object distributed processing, parallel processing, or virtual machine processing can also be constructed to implement the example systems and/or methods described herein.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, these examples are not the only way to implement such systems, methods and articles of manufacture. Therefore, although certain example methods, apparatus and articles of manufacture have been described herein, the scope of coverage of this patent is not limited thereto. On the contrary, this patent covers all systems, methods, and articles of manufacture fairly falling within the scope of the appended claims either literally or under the doctrine of equivalents.

What is claimed is:

1. A method to provision a subscriber in a communication network, the method comprising:
    detecting that a location of a subscriber has changed from a first location to a second location by at least one of determining that communications corresponding to the subscriber are routed to the second location for an amount of time exceeding a threshold, determining that a number of services exceed a threshold, or determining that a service usage exceeds a threshold;
    instructing a first customer profile repository to transfer a customer profile associated with the subscriber to a second customer profile repository corresponding to the second location in response to detecting the location change; and provisioning the customer profile at the second customer profile repository.

2. A method as defined in claim 1, further comprising updating at least one of an index or a cache corresponding to the second customer profile repository.

3. A method as defined in claim 1, wherein the first and second customer profile repositories are instances of a consolidated network repository.

4. A method as defined in claim 1, further comprising providing the customer profile to at least one of a billing system or a central subscriber manager.

5. A method as defined in claim 1, wherein provisioning the customer profile comprises creating the customer profile at the second customer profile repository.

6. A method as defined in claim 1, further comprising notifying a subscriber manager associated with the second customer profile repository.

7. A system comprising:
first and second customer profile repositories corresponding to first and second physical areas;
a first subscriber manager to provision a subscriber in the first customer profile repository, to detect when a location of the subscriber changes from the first to the second physical area by at least one of determining that communications corresponding to the subscriber are routed to the second physical area for an amount of time exceeding a threshold, determining that a number of services exceed a threshold, or determining that a service usage exceeds a threshold, and to instruct the first customer profile repository to transfer a customer profile associated with the subscriber to the second customer profile repository in response to detecting the location change;
a second subscriber manager to provision the subscriber in the second customer profile repository in response to the second customer profile repository receiving the customer profile.

8. A system as defined in claim 7, wherein the first and second customer profile repositories comprise a plurality of physical repositories.

9. A system as defined in claim 7, wherein the subscriber manager updates at least one of an index or a cache corresponding to the second customer profile repository.

10. A system as defined in claim 7, wherein the second subscriber manager notifies one or more network systems in response to provisioning the subscriber in the second physical area.

11. A system as defined in claim 7, wherein the second customer profile repository notifies the second subscriber manager in response to receiving the customer profile, and the second subscriber manager provisions the subscriber in the second customer profile repository in response to the notification.

12. A tangible machine readable storage medium comprising machine readable instructions which, when executed, cause a machine to perform a method comprising:
detecting that a location of a subscriber has changed from a first location to a second location by at least one of determining that communications corresponding to the subscriber are routed to the second location for an amount of time exceeding a threshold, determining that a number of services exceed a threshold, or determining that a service usage exceeds a threshold;
instructing a first customer profile repository to transfer a customer profile associated with the subscriber to a second customer profile repository corresponding to the second location in response to detecting the location change; and
provisioning the customer profile at the second customer profile repository.

13. A storage medium as defined in claim 12, wherein the method further comprises updating at least one of an index or a cache corresponding to the second customer profile repository.

14. A storage medium as defined in claim 12, wherein the first and second customer profile repositories are instances of a consolidated network repository.

15. A storage medium as defined in claim 12, wherein the method further comprises providing the customer profile to at least one of a billing system or a central subscriber manager.

16. A storage medium as defined in claim 12, wherein provisioning the customer profile comprises creating the customer profile at the second customer profile repository.

17. A storage medium as defined in claim 12, wherein the method further comprises notifying a subscriber manager associated with the second customer profile repository.

* * * * *